United States Patent
Aoyama et al.

(10) Patent No.: US 7,746,413 B2
(45) Date of Patent: Jun. 29, 2010

(54) OPERATION SCREEN CONTROLLING METHOD, OPERATION SCREEN CONTROLLING PROGRAM, AND DISPLAY DEVICE

(75) Inventors: Keiichi Aoyama, Tokyo (JP); Shigeki Mori, Saitama (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 11/750,672

(22) Filed: May 18, 2007

(65) Prior Publication Data
US 2007/0222892 A1  Sep. 27, 2007

Related U.S. Application Data

(63) Continuation of application No. 10/854,231, filed on May 27, 2004, now Pat. No. 7,250,988.

(30) Foreign Application Priority Data

May 28, 2003  (JP)  ............................. 2003-150212
May 25, 2004  (JP)  ............................. 2004-154154

(51) Int. Cl.
   *H04N 5/50*  (2006.01)
(52) U.S. Cl. ..................................... 348/734
(58) Field of Classification Search ................ 348/734, 348/725, 706; 725/139, 140, 141, 10, 11; 340/825.72, 825.69
See application file for complete search history.

(56) References Cited

U.S. PATENT DOCUMENTS

| | | | |
|---|---|---|---|
| 5,721,583 A * | 2/1998 | Harada et al. | 725/24 |
| 6,466,971 B1 | 10/2002 | Humpleman et al. | 709/220 |
| 6,473,088 B1 | 10/2002 | Matsumoto et al. | 345/530 |
| 6,614,439 B2 | 9/2003 | Matsumoto et al. | 345/530 |
| 6,812,881 B1 | 11/2004 | Mullaly et al. | 341/176 |
| 6,819,864 B2 | 11/2004 | Fujita et al. | 386/46 |
| 6,993,134 B1 * | 1/2006 | Epstein | 380/262 |
| 7,043,532 B1 | 5/2006 | Humpleman et al. | 709/208 |
| 7,068,304 B2 * | 6/2006 | Kawada et al. | 348/192 |
| 7,109,974 B2 * | 9/2006 | Kempisty | 345/173 |
| 7,111,320 B1 | 9/2006 | Novak | 725/139 |
| 7,250,988 B2 * | 7/2007 | Aoyama et al. | 348/734 |
| 2002/0149704 A1 | 10/2002 | Kano et al. | 348/706 |
| 2002/0175924 A1 | 11/2002 | Yui et al. | 345/660 |
| 2005/0088333 A1 | 4/2005 | Allport | 341/176 |

FOREIGN PATENT DOCUMENTS

JP   2001-61110   3/2001

* cited by examiner

*Primary Examiner*—Paulos M Natnael
(74) *Attorney, Agent, or Firm*—Fitzpatrick, Cella, Harper & Scinto (57) ABSTRACT

A controlling method of an operation screen for operations of a remote control device, includes the steps of acquiring an attribute of a remote control device, and determining an operation form corresponding to the remote control device from among a plurality of operation forms previously stored based on the acquired attribute of the remote control device. An additional step includes displaying an operation screen related to the determined operation form displayed.

11 Claims, 10 Drawing Sheets

| MAKER CODE | MODEL CODE | OPERATION DEVICE INFORMATION | | | |
|---|---|---|---|---|---|
| | | POINTING DEVICE | TEN KEY | LIQUID CRYSTAL TOUCH PANEL | DIAL DEVICE |
| S | 01 | ◎ | ○ | ○ | ○ |
| P | 4 | × | ◎ | × | × |
| N | 00 | × | × | ◎ | × |
| T | 13 | × | ◎ | × | × |
| S P | 2 | ○ | ◎ | × | × |
| D | 5 | ◎ | ○ | × | × |

◎ : MOUNTED ON REMO-CON (MOST ACCESSIBLE ON HAND)

○ : MOUNTED ON REMO-CON

× : UNMOUNTED ON REMO-CON

Fig.10

OPERATION SCREEN CONTROLLING METHOD, OPERATION SCREEN CONTROLLING PROGRAM, AND DISPLAY DEVICE

This is a continuation of Application Ser. No. 10/854,231, filed on May 27, 2004.

BACKGROUND OF THE INVENTION

1. Field of the Invention

The present invention relates to an operation screen controlling method, an operation screen controlling program and a display device and, more particularly, to a control method of an operation screen having relations to the operations of a remote control device.

2. Description of the Related Art

In case a plurality of remote control devices for controlling a television receiver are used, as disclosed in JP-A-2001-61110, there has been proposed a television receiver, which is enabled to use a plurality of remote control devices (as abbreviated into the "remo-con") by giving priority to the individual remote control devices to improve the operability of the television receiver.

SUMMARY OF THE INVENTION

Depending on the operation screen of a graphical user interface, however, the operability may be degraded by the remote control device used.

Therefore, an object of the invention is to provide an operation screen controlling method, an operation screen controlling program and a display device, which can eliminate those disadvantages.

In order to achieve the object, in a remote control system according to the invention, there is provided an operation screen controlling method which comprises: the step of specifying image signals for displaying an operation screen, according to the attributes of a remote control device; and the step of outputting the image signals.

BRIEF DESCRIPTION OF THE DRAWINGS

The invention, together with further advantages thereof, may best be understood by reference to the following description taken in conjunction with the accompanying drawings, in which.

DESCRIPTION OF THE PREFERRED EMBODIMENTS

Figure 10:
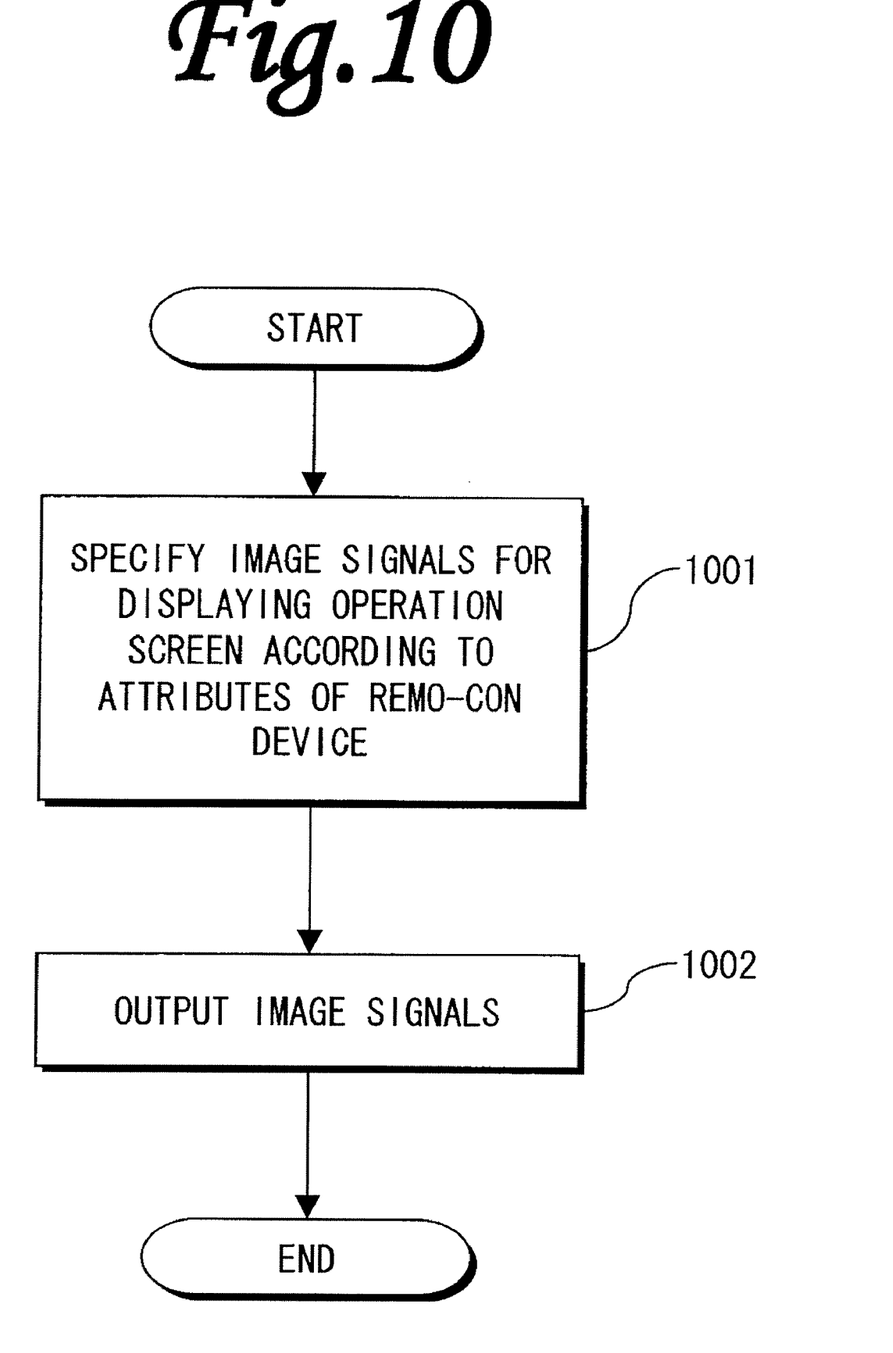
FIG. 10 is a flow chart showing a flow of an operation screen controlling method according to an embodiment of the invention.

Embodiments of the invention will be described with reference to the accompanying drawings. FIG. 10 shows a flow of an operation screen controlling method according to an embodiment of the invention.

In the embodiment of the invention, as shown in FIG. 10, image signals for displaying an operation screen are specified at first in Step 1001 in accordance with the attributes of a remote control device. After this, the routine transfers to Step 1002, at which the specified image signals are outputted. Here, the attributes of the remote control device in the invention are characteristics intrinsic to the remote control device. Moreover, these intrinsic characteristics of the remote control device are the identification information itself for identifying a plurality of remote control devices from one another, and whether or not the remote control device is provided with a pointing device such as a cross key for moving a pointer or focus position on the screen or a specific operation device such as a numeral key.

On the other hand, the operation screen is constructed of either a display element corresponding to the operation device owned by the remote control device or a display element corresponding to such a specific operation of the remote control device as can be performed by the user. As the operation screen, a screen containing an image indicating that numeral key can be adopted as a display element corresponding to a predetermined numeral key provided in the remote control device. Moreover, a screen containing the image indicating the cross key can be adopted as the display element corresponding to the cross key of the remote control device.

In these cases, the display element is desirably an element for displaying the numeral key disposed in the remote control device or the mode of an operation device such as a bonding device precisely. However, the display element should not necessarily be limited to the image for displaying the mode of the operation device but may be a state, in which the user can recognize the corresponding relation between the operation device of the remote control device and the image contained by the operation screen. Moreover, the display element is preferred to have the construction, in which the operation screen contains at least one display element corresponding one-by-one to the operation device owned by the remote control device, but should not necessarily be limited to the construction. Specifically, the operation screen can be one containing such a plurality of selection branches for display elements as are to be selected by a specific operation of the pointing device of the remote control device, for example, by a depression of the cross key to be designated four upward, downward, leftward and downward directions, such as the images of a plurality of tabs to be sequentially selected by the specific operation. Preferably, it is possible to adopt the construction, in which the individual images (as will be called the "graphical user interface (GUI) parts") as the display elements are stored individually in storage devices. In case the operation screen containing the display elements is to be displayed, the images or the display elements can be combined to produce the image signals for displaying the operation screen. It is also preferably possible to adopt the construction, in which the information indicating the arrangement relation of the display elements, that is, the layout information is determined according to the attributes of the remote control device. However, it is unnecessary to store the display elements individually as different images. For example, it is possible to store one image containing a plurality of display elements such as an image displaying the entirety of the remote control device having a plurality of display elements. In this case, the image displaying the entire remote control device may be stored to correspond individually to a plurality of kinds of remote control devices. As a result, the step of reading the image corresponding to a specific remote control device in accordance with the identification information of the remote control device can be easily executed as a step of specifying the image signals for displaying the operation screen.

Moreover, the screen to be actually displayed on the display may not be limited to the display elements of the operation screen. For example, a screen displaying television broadcasting may be displayed simultaneously with the display elements of the operation screen. In this case, the image signal outputting step may output the image signals, which are synthesized from the image signals for displaying the operation screen and other image signals (for example, the image signals for displaying the television broadcasting).

As a preferable mode, there can be adopted the construction, in which the step of specifying the image signals has a step of selecting the display elements constructing the operation screen in accordance with the attributes. As a preferable mode, moreover, there can be adopted the construction, in which the step of specifying the image signals has a step of selecting one of a plurality of image signals for displaying a plurality of operation screens individually. As a preferable mode, there can be adopted the construction, in which the step of specifying the image signals has a step of evaluating a degree of suitability between the remote control device and each of forms of a plurality of operation screens based on the attributes of the remote control device. As preferable mode, each of forms which can be display by the display apparatus can be used as each of forms of a plurality of operation screens which is evaluate.

As a preferable mode, there can be adopted the construction, in which the step of specifying the image signals is performed according to the identification information for identifying the remote control device from another remote control device.

As a preferable mode, moreover, there can be adopted the construction, in which the step of specifying the image signals has a step of reading the attributes of a plurality of remote control device from storage device storing the attributes. The storage device can be exemplified by a semiconductor memory or a hard disk device.

As a preferable mode, moreover, there can be adopted the construction, in which the step of specifying the image signals has a step of reading at least any of display elements constructing the operation screen, an image containing a plurality of display elements and the layout information of the display elements from the storage device. As a preferable mode, moreover, there can be adopted the construction, in which the step of specifying the image signals has: a step of reading a plurality of attributes of the remote control device from storage device storing the attribute; and a step of reading either the display elements to construct the operation screen in accordance with the read attributes or an image containing a plurality of display elements, from the storage device. There can be preferably adopted the construction for preparing a remote control database, which is stored with the attributes of the remote control device, and a database, which is stored with: a display element; an image containing a plurality of display elements; a layout of display elements; and/or an operation method of the operation device corresponding to the display element.

As a preferable mode, moreover, there can be adopted the construction having a step of updating the database, which is stored with the attributes of the remote control device. As a preferable mode, moreover, there can be adopted the construction, which has a step of receiving signals outputted from the remote control device and a step of updating in case the attributes of the remote control device cannot be specified from the signals outputted from the remote control device. Specifically, the updating step can be performed by a step of inquiring an inquirer, and a step of registering the database with the attribute information sent in response to an inquiry.

As a preferable mode, moreover, there can be adopted the construction, which has a step of receiving signals outputted by the remote control device, and in which the image signal specifying step is a step for specifying the image signals in accordance with the attributes to be specified with the signals outputted from the remote control device.

As a preferable mode of a control program of an operation screen, on the other hand, there can be adopted the construction, which has a step of specifying image signals for displaying an operation screen, in accordance with the attributes of a remote control device, and a step of outputting the image signals.

First Embodiment

Figure 1:
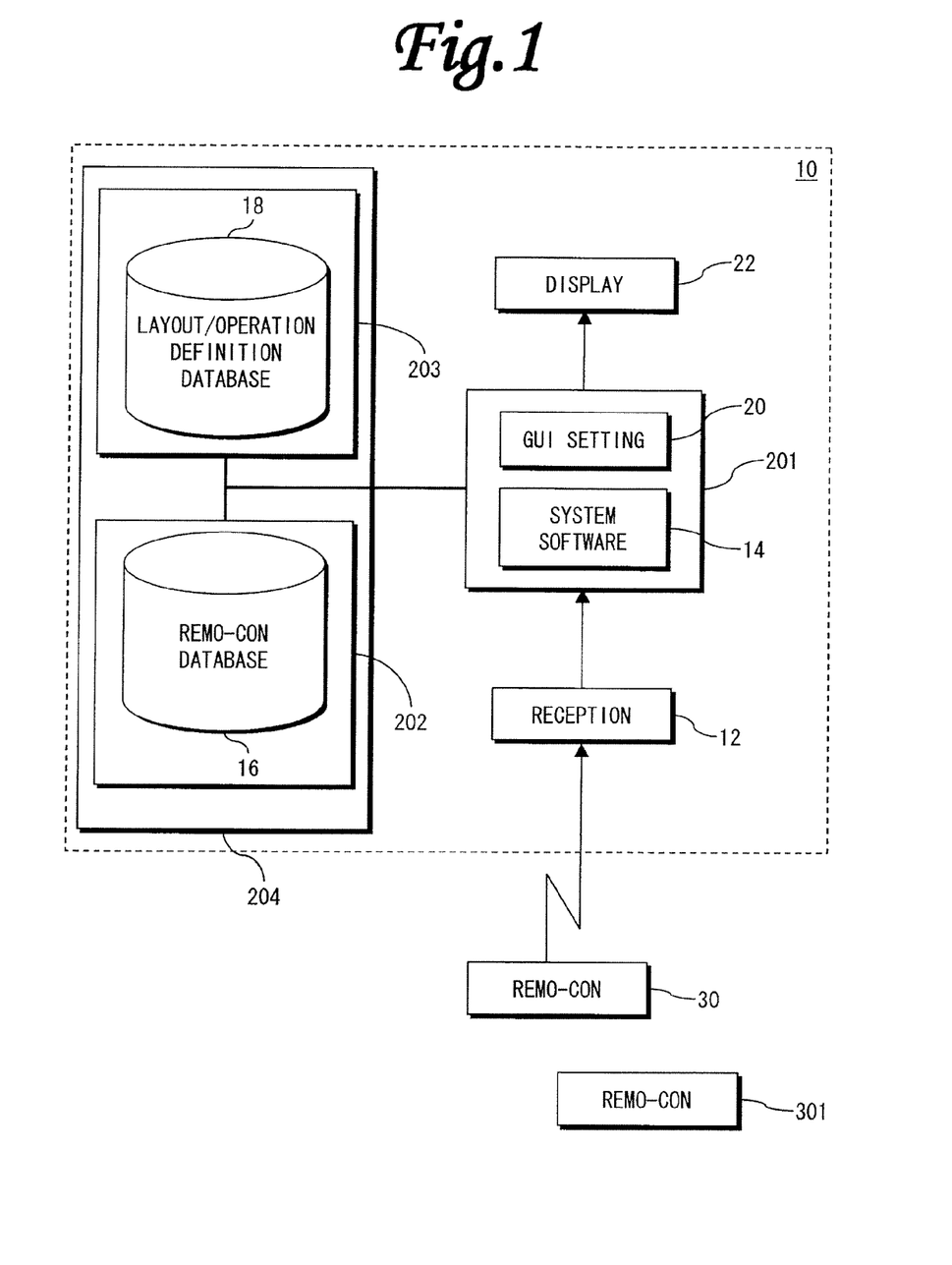
FIG. 1 is a block diagram schematically showing a construction of a display device according to a first embodiment of the invention.

The aforementioned mode of embodiment will be described in connection with its more detailed example. FIG. 1 shows a construction of a display device according to a first embodiment of the invention, and FIG. 2 shows a flow chart of a control procedure according to the first embodiment.

As shown in FIG. 1, a digital television receiver 10 acting as the display device is provided with a reception device 12 for discriminating the signals of a plurality of remote control devices 30 and 301. The first embodiment will be described by assuming the state, in which the user uses the remote control device 30 of the remote control devices 30 and 301.

The digital television receiver 10 is provided with an execution unit 201 for executing the steps of FIG. 10. The execution unit 201 is provided with: a system software 14 or a storage device such as a flash memory, which is stored with a program for executing the operations of Step 1001 and Step 1002; and a GUI setting unit 20 or a circuit for executing the program.

Figure 2:
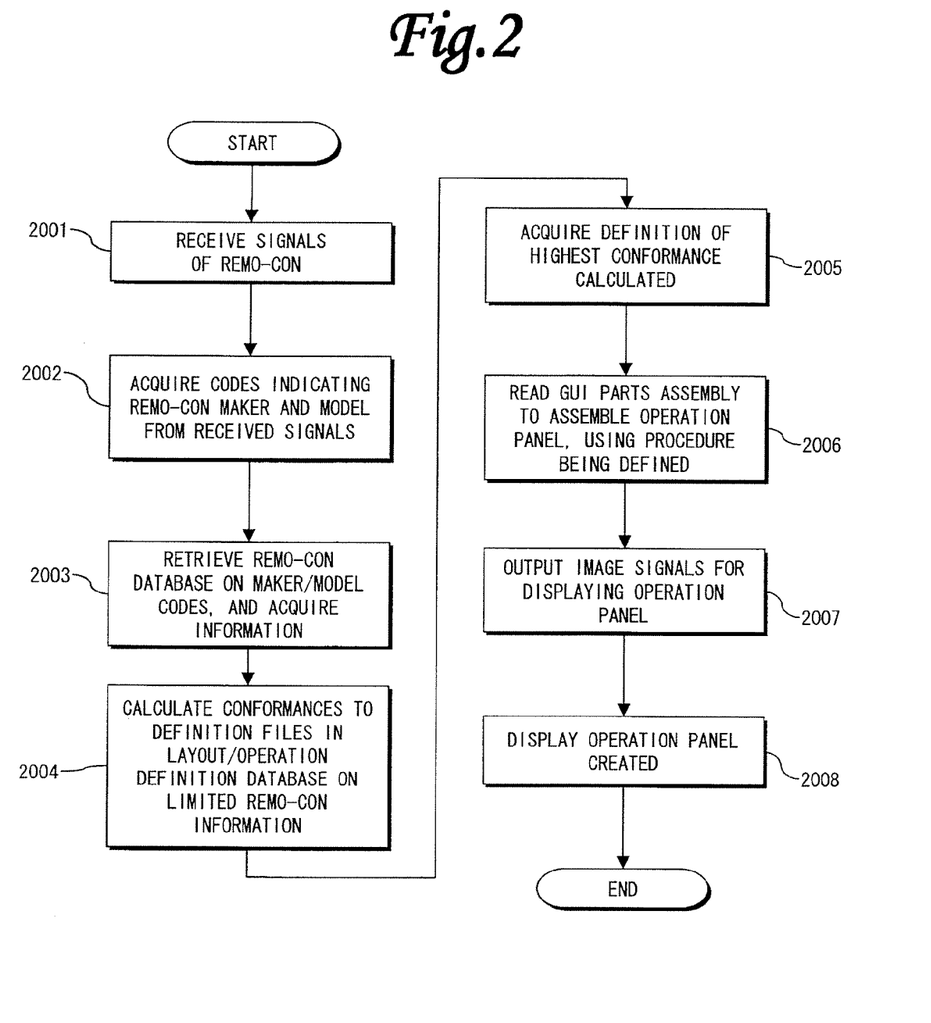
FIG. 2 is a flow chart showing a flow of changing the GUI layout and operation methods according to the first embodiment of the invention.

At Step 2001 of FIG. 2, moreover, the execution unit 201 extracts (at Step 2002 of FIG. 2) the identification code of the remote control device 30 from the signals outputted from the remote control device 30 and received by the reception device 21. This identification code contains the maker and the model name or type number of the remote control device 30. There can be adopted the mode, in which the execution unit 201 reads the signals for displaying the image of the remote control device 30 on the basis of the identification code and outputs the signals read from a storage device 204 constituted by a flash memory or the like as the image signals for forming the operation screen. As a result, the image of the remote control device 30 is displayed in the display unit of a display device 22.

In the first embodiment, however, the following construction is adopted to display the operation screen more softly.

Specifically, the execution unit 201 retrieves a remote control database 16 stored with the attributes of the remote control device on the basis of the identification code, and reads the attributes of the remote control device 30 used (Step 2003 in FIG. 2). Here, the attributes thus read are the pieces of information (that is, the presences or absences and functions of the button, the pointing device, the dial device and the display) on the arrangement of the operation devices owned by the remote control device. The remote control database 16 is constructed in a storage device 202 such as a flash memory.

Figure 3:
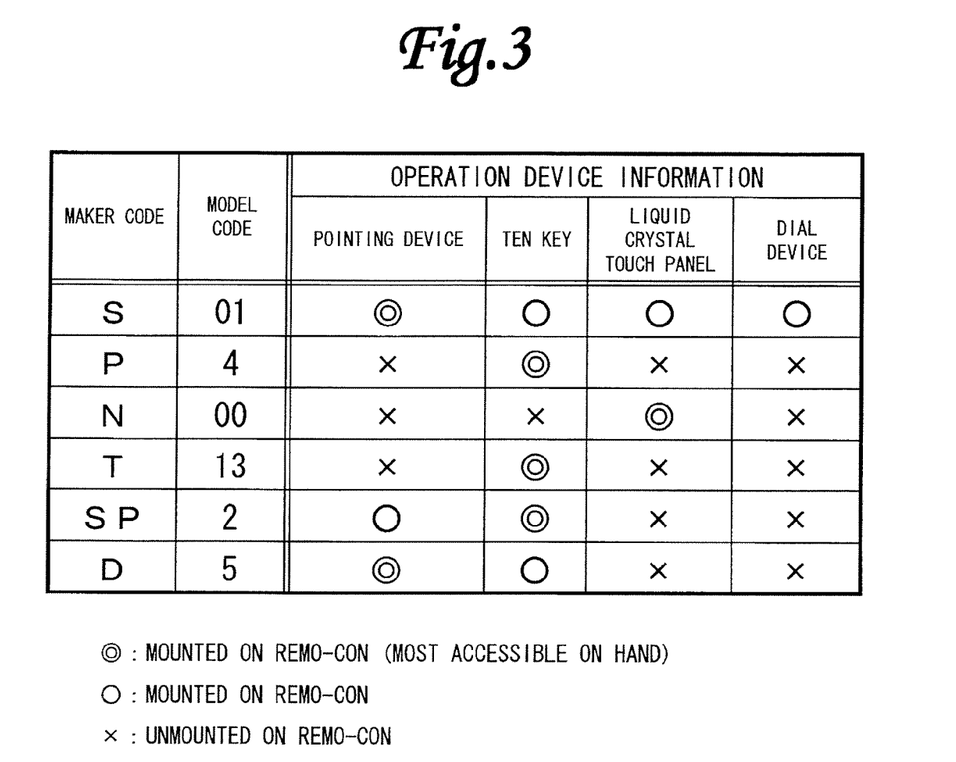
FIG. 3 is a diagram showing one example of data in a remote control database.

FIG. 3 shows one example of the data stored in the remote control database 16. The data specify not only the presences or absences of the operation devices but also the designations of the operation devices, which are close to the fingers of the user holding the remote control device, and the device group. In FIG. 3, symbols "○" or "⊚" indicate that the remote control device has the operation device, as indicated. Especially, the symbol "⊚" indicates that the operation device is disposed at such a position as can be easily operated when the remote control device is held in an ordinary manner. On the other hand, a symbol "x" indicates the remote control device lacks in the operation device.

On the basis of the arrangement information obtained from the database 16, moreover, the execution unit 201 retrieves a layout/operation definition database 18, and reads out the definitions of the GUI parts suited for the remote control device 30 used, and their layout information and operation methods. For example, the operation screen displaying the read GUI parts, the remote control device 30 based on the layout information, and the operation device disposed in the remote control device 30 can be constructed and displayed.

However, the first embodiment is constructed to display not the operation screen indicating the mode of the remote control device 30 itself but the operation screen of a specific form. Specifically, a plurality of forms such as a form A, a form B and a form C are individually preset so that any of the operation screens of the forms may be selectively displayed. The individual forms can adopt the hierarchical menu type, the tab menu type and the pull-down menu type, for example. Here, the individual forms have different necessities for the operation devices of the individual remote control devices.

Specifically in the form A, for example: the pointing device is necessary; the ten key or the liquid crystal touch panel is unnecessary; and it does not matter (or it is redundant) whether or not the dial device is provided. In the form B: the pointing device and the ten key are necessary; the liquid crystal touch panel is unnecessary; and it does not matter (or it is redundant) whether or not the dial device is provided. In the form C: the liquid crystal touch panel and the ten key are necessary; but the pointing device and the dial device are unnecessary. Here: the necessary case is set with a numerical value 3 as the degree of necessity; the unnecessary case is set with a numerical value 0 as the degree of necessity; and the redundant case is set with a numerical value 1 as the degree of necessity. In the attributes of the remote control device, on the other hand: the presence/absence information on a predetermined operation device is set with 3 in case the operation device is disposed at the easily used position (corresponding to the symbol "⊚" of FIG. 3); the presence/absence information on a predetermined operation device is set with 1 in case the operation device is present but not disposed at the easily used position (corresponding to the symbol "○" of FIG. 3); and the presence/absence information on a predetermined operation device is set with 0 in case the operation device is absent (corresponding to the symbol "x" of FIG. 3).

Figure 4:
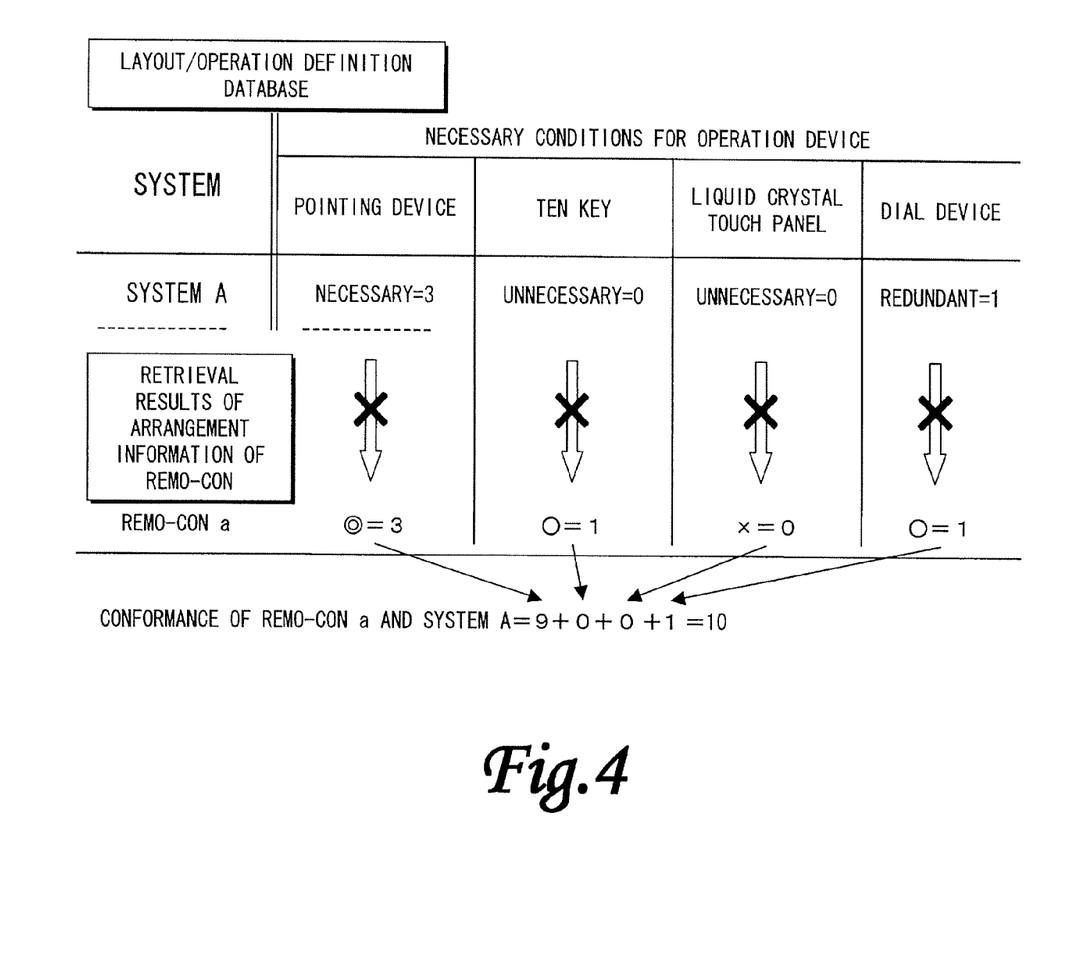
FIG. 4 is a chart showing a flow of calculating the conformances of the GUI layout and the operation methods.

On the basis of the attributes of the remote control device 30 read from the remote control database, moreover, the execution unit 201 integrates the pieces of presence/absence information and the necessities of the individual operation devices, and totals the results of the individual operation devices. FIG. 4 shows an example of these integrating and totaling operations.

In this example, as shown in FIG. 4, the operations are executed on a remote control device a and a form A, in which the pointing device is disposed at an easily operated position, in which the ten key and the dial device are disposed not at the easily operated position, and in which the liquid crystal touch panel is not disposed. Specifically in FIG. 4, conformances of the form A and the remote control device a are the degree of necessity of the pointing device×the presence/absence information of the pointing device+the degree of necessity of the ten key×the presence/absence information of the ten key+the degree of necessity of the liquid crystal touch panel×the presence/absence information of the liquid crystal touch panel+ the degree of necessity of the dial device×the presence/absence information of the dial device=3×3+0×1+0×0+1× 1=10. At Step 2004 shown in FIG. 2, moreover, the operations of those conformances are executed for the individual forms. After this, the routine advances to Step 2005 shown in FIG. 2, at which the form is specified to have the highest value of the conformances of the individual forms. As a result, at Step 2006 shown in FIG. 2, the operation screen of the form of the highest conformance, that is, the form having the conformance to the remote control device 30 is specified and assembled. The operations of Step 2001 to Step 2006 thus far described construct those of Step 1001 of FIG. 10. As an other preferable mode, other method of evaluating a degree of suitability between the remote control device and each of forms of a plurality of operation screens based on the attributes of the remote control device can be adopted.

After this, the routine transfers to Step 2007 shown in FIG. 2, the operation screen thus assembled is outputted as the image signals for displaying in the display device 22.

Here, the definitions of the layout and the operation methods of the GUI parts include the arrangement rules of the GUI parts and the focus movement rules by the operations of the remote control device. The definitions contain the procedures to read the set of the GUI parts and to make it into the operation panel to be displayed in the display device 22. At Step 2008 shown in FIG. 2, the operation panel or the operation screen is displayed at a predetermined position of the display device 22 on the basis of the image signals produced by those procedures.

In the environment for the user to select a favorite remote control device, a controlled device can provide the layout and the operation methods of the GUI parts suited for the remote control device, without being followed by any explicit operation of the user. Moreover, the display contents need not be changed on the change in the layout and the operation methods of the GUI parts.

Figure 5:
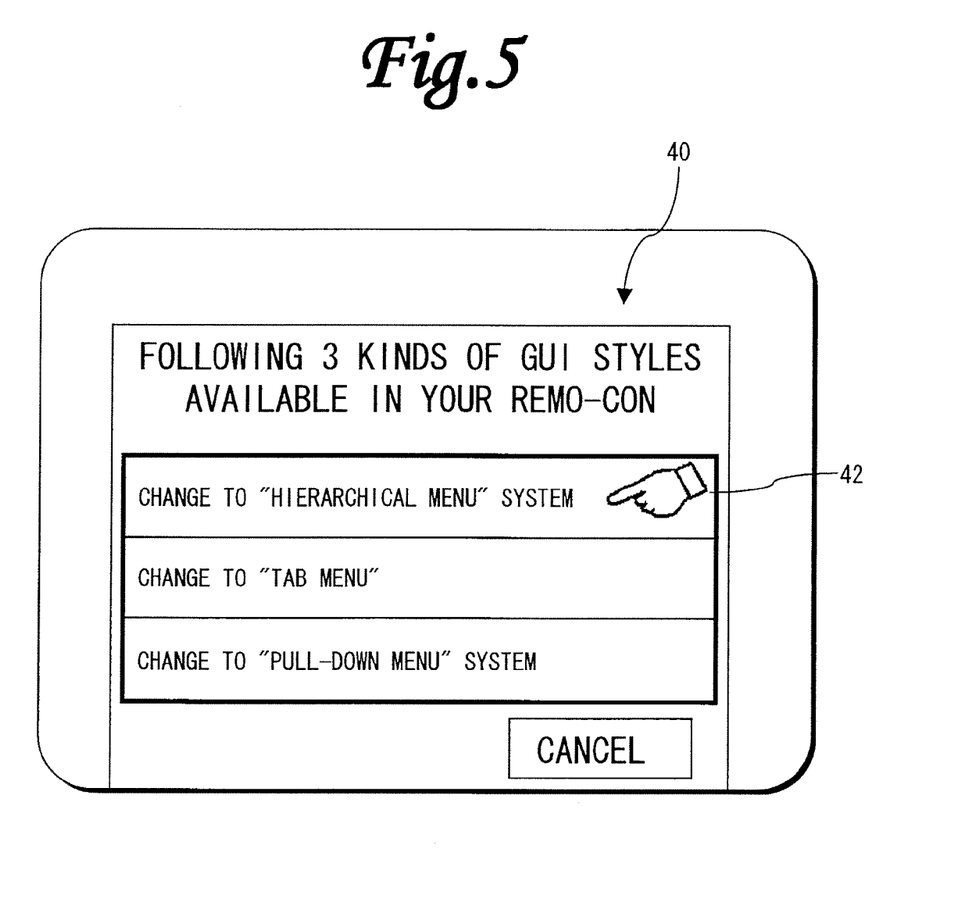
FIG. 5 is a diagram showing an example of an operation screen for changing the GUI layout and the operation methods.
Figure 6:
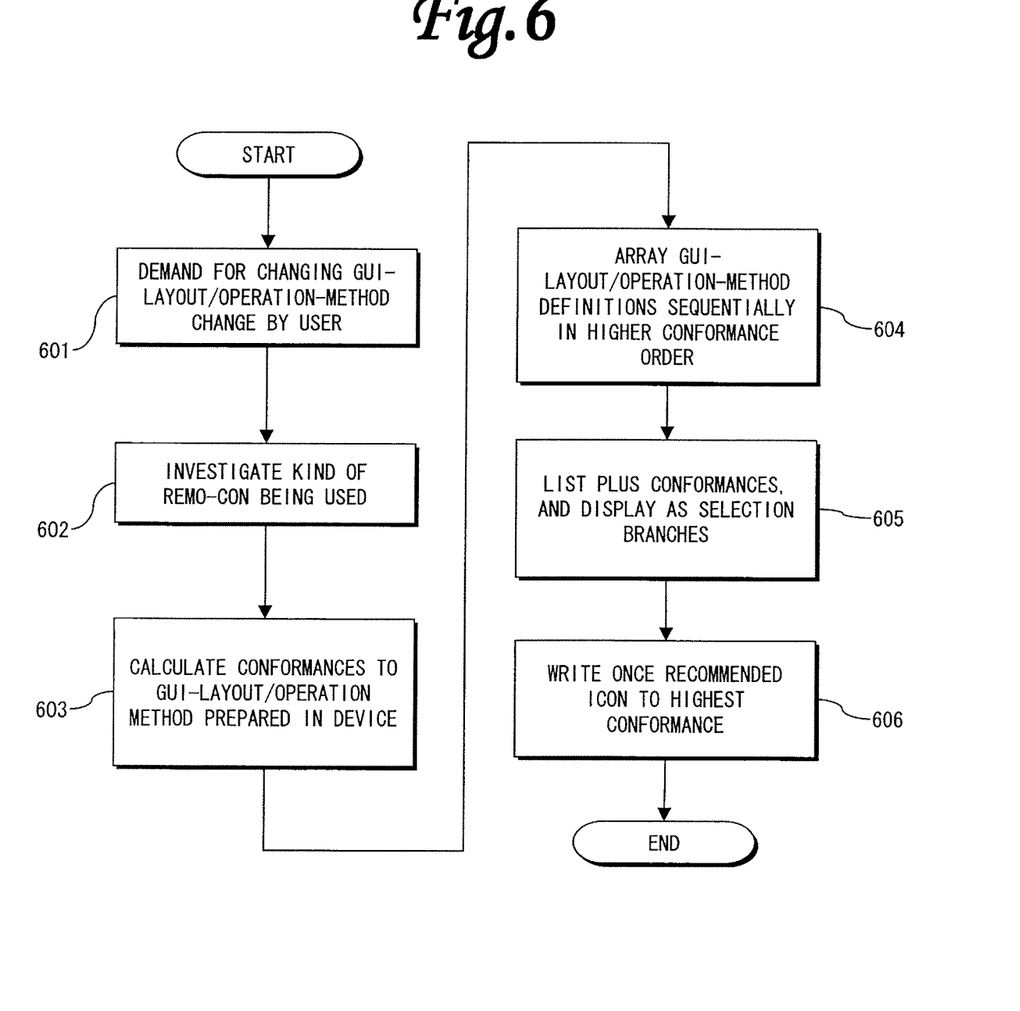
FIG. 6 is a flow chart showing a flow of works for selecting the available change definitions of the GUI layout and the operation methods.

Here has been described the construction for displaying the operation screen of the most conformable form. However, the construction may also be made for the user to select the operation screen. FIG. 5 shows an example of the screen presenting a plurality of operation screens as selection branches for the user. FIG. 6 shows a flow chart of the works for the user to change the layout and the operation methods of the GUI parts. Here is shown an example, in which the operation screen is constructed according to a predetermined layout of the GUI parts. Therefore, the operation screen can be changed by changing the layout of the GUI parts.

When the layout and the operation methods of the GUI parts are to be changed, the execution unit 201 executes the aforementioned conformance decisions on the definitions of the GUI layout and the operation methods stored in the layout/operation definition database 18. At Step 603, the conformances are decided to the remote control device being used by the user having demanded the change. Prior to this conformance decision, the identification code of the remote control device is extracted from the signals outputted from the remote control device in Step 602. This embodiment is assumed that the change in the form of the operation screen is demanded at Step 601 prior to Step 602 by the user operating a specific operation device of the remote control device.

In a form changing screen 40, moreover, the results of the conformance decisions are arrayed and displayed sequentially in the order from the display form of the operation screen of the higher conformance. The form having a minus conformance, that is, the form, that is, the definitions of the layout and the operation methods of the GUI parts unavailable to the user with the device construction of the remote control device used is not displayed in the form changing screen 40.

In the form changing screen 40, an icon 42 indicating a form recommended for the remote control device being used is displayed in addition to one having a value exceeding a conformance obtained from the result of the conformance decision.

Thus, the user can select an operation screen of a favorite form in the environment where the user can select the favorite remote control device. The using conveniences can be further improved by making unselectable the form, which cannot be used by the remote control device selected by the user.

Second Embodiment

Figure 7:
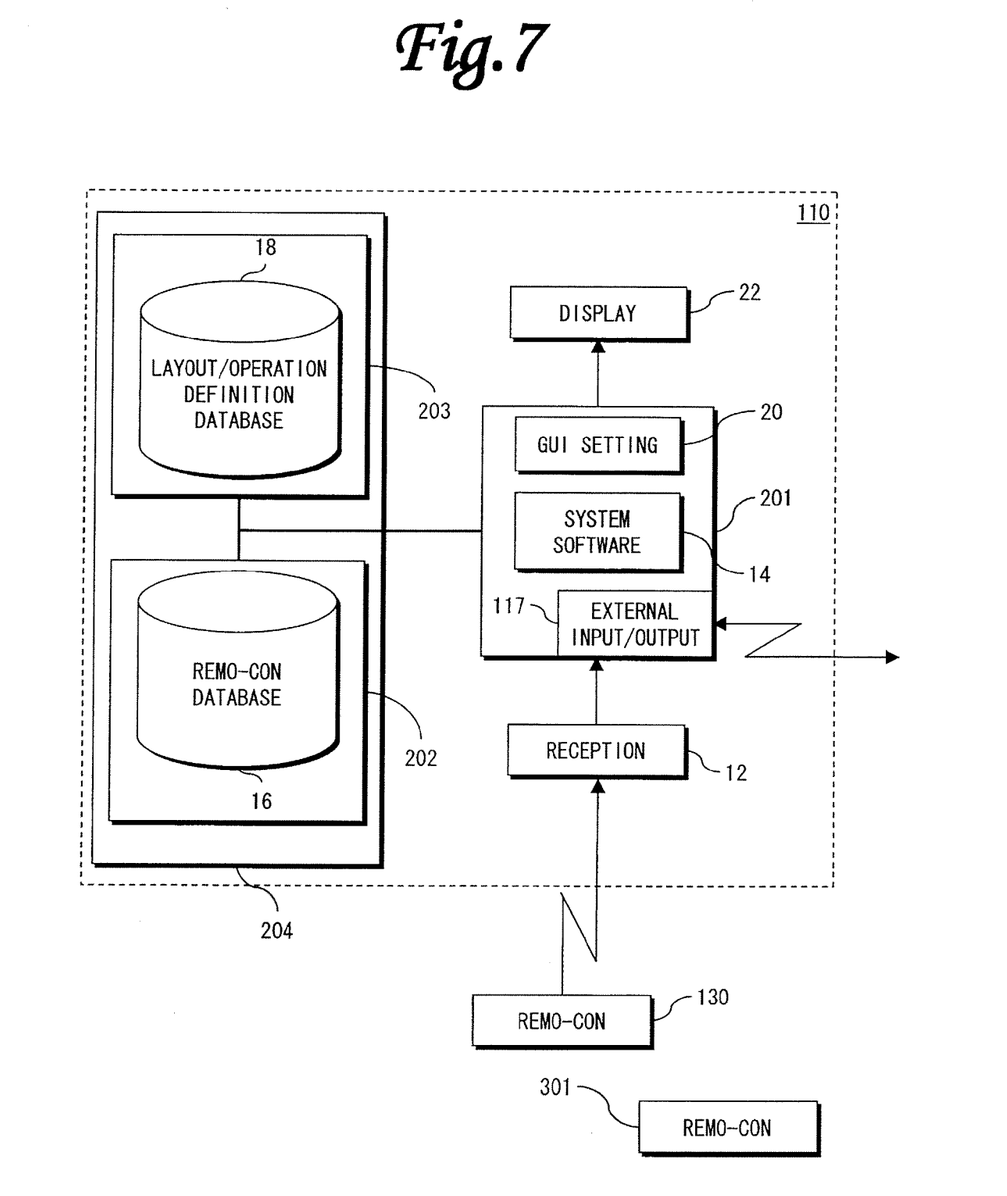
FIG. 7 is a block diagram schematically showing a construction of a display device according to a second embodiment of the invention.
Figure 8:
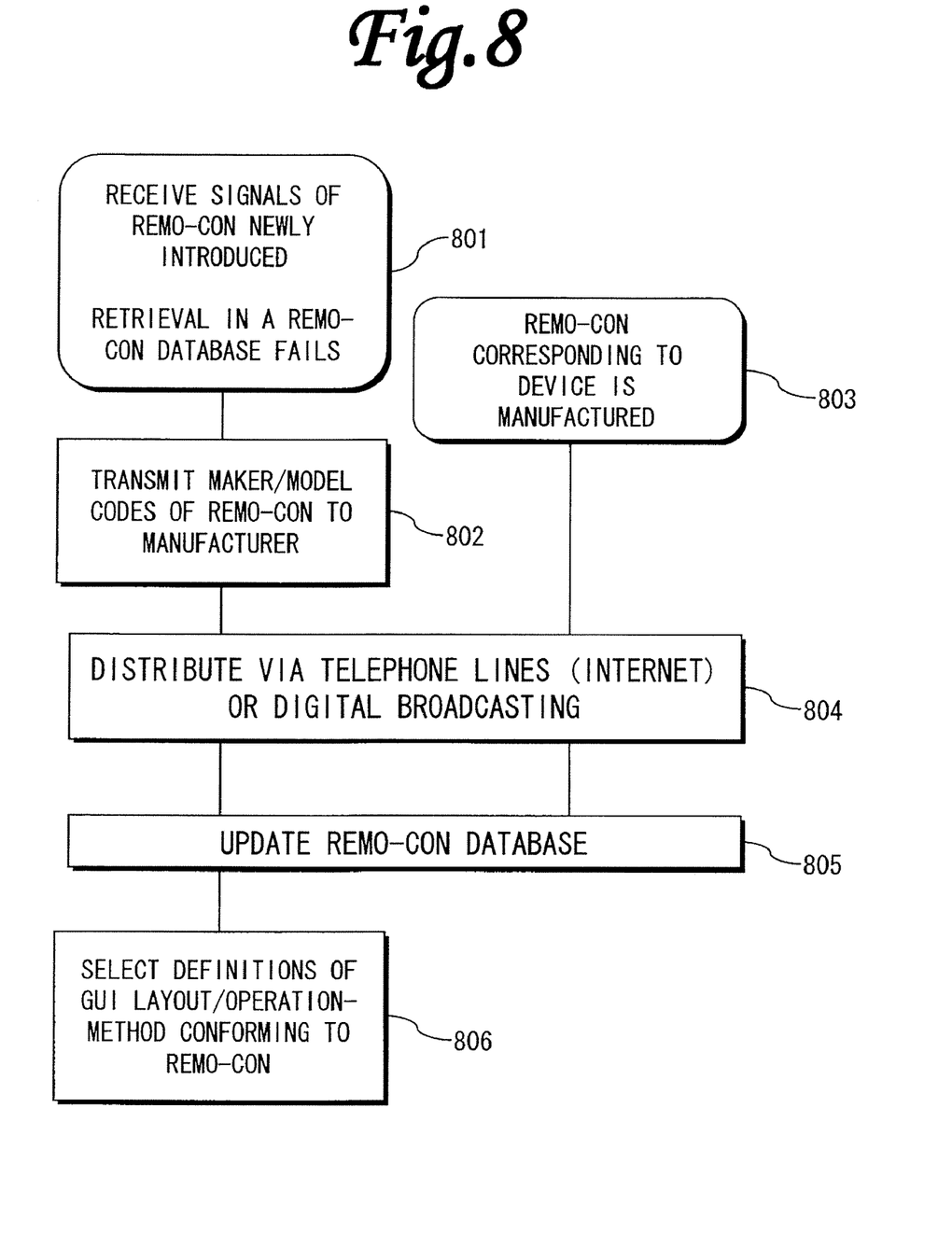
FIG. 8 is a chart showing a flow of works to add information to the remote control database.

A second embodiment of the invention will be described with reference to the accompanying drawings. FIG. 7 shows a schematic construction block diagram of a display device according to the second embodiment of the invention. In the second embodiment, when a remote control device not registered in the remote control database is used, the outside can be inquired of the arrangement information on the remote control device, and the arrangement information can be added to the remote control database. FIG. 8 shows a flow chart of a routine for registering the remote control database additionally with the arrangement information of the remote control device.

A digital television receiver 110 according to the second embodiment is different from that of the first embodiment in that it is provided with an external input/output device 117 and in that it has a function to inquire the outside of the attributes of the remote control device by using the external input/output device 117. This function can be executed by the program stored as the system software 14.

At first Step 801, the execution unit 201 reads the identification code of a remote control device 130 from the received signals transmitted from the remote control device 130. The execution unit 201 retrieves the remote control database 16 on the basis of the read identification code. In case the retrieval finds that the database 16 is not registered with the arrangement information on the remote control device 130 used, the routine transfers to Step 802, at which the outside is inquired of the arrangement information of the remote control device 130 by the external input/output device 117 of the execution unit 201.

At Step 803, on the other hand, the attributes of the remote control device 130 can be distributed under the environment where the remote control device 130 was manufactured. In response to the inquiry (or demand) at Step 802, therefore, the attributes of the remote control device 130 are distributed from the distributor at Step 804. In response to the distribution of the attributes, at Step 805 the execution unit 201 registers the remote control database 16 with the arrangement information obtained from the outside together with the identification information of the remote control device. On the basis of the arrangement information, moreover, the layout/operation definition database 18 is retrieved to read out the display form (that is, the definitions of the layout and the operation method of the GUI parts in the second embodiment) suited for the remote control device 130 used. Like the first embodiment, proper one is selected at Step 806 from the layout and operation method of the GUI parts stored in the layout/operation definition database 18 in accordance with the arrangement information of the remote control device 130.

Moreover, the GUI setting unit 20 of the execution unit 201 outputs the image signals for displaying the operation screen of the highest conformance to the display device 22. Specifically in the GUI setting unit 20, the layout and the operation methods of the GUI parts and the set of the GUI parts specifying the inclusion relations or the display contents are defined separately of each other on the GUI to be used in the display device 22.

Figure 9:
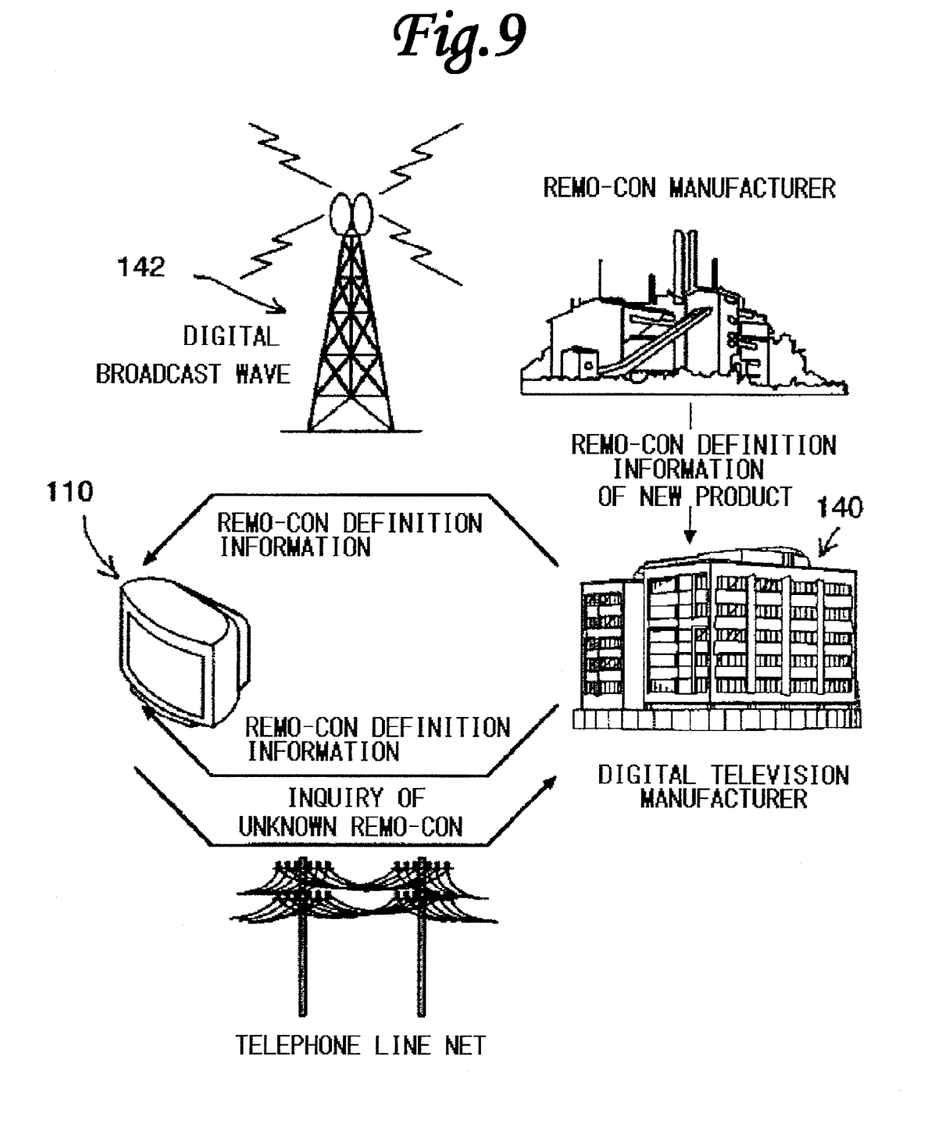
FIG. 9 is a diagram showing a flow of definition information of a remote control device in the outside.

FIG. 9 shows one example of the transfer route of the arrangement information of the remote control device 130 from the outside to the television receiver 110. In case an unknown remote control device is detected, as shown in FIG. 9, the receiver 110 transmits the code of the maker/model contained in the remote control signals, from the remote control device to a manufacturer 140 of the receiver 110, and executes the inquiry. The television manufacturer 140 having received the inquiry transmits the arrangement information of the remote control device corresponding to the maker/model code inquired, to the television receiver 110 via a wide area network such as the telephone lines, the internet or a broadcasting station 142.

When at least the remote control device corresponding to the television receiver 110 is shipped to the market, the television manufacturer 140 distributes the definition information of the remote control device in advance to the television receiver 110 through the digital broadcasting station 142 thereby to update the remote control database 116 of the television receiver 110 of the user. As a result, it is possible to suppress the occurrence of the unknown remote control device as much as possible.

In the environment where the user can select the remote control device, as has been described hereinbefore, there can be provided an environment where a new remote control device corresponding to the television receiver of the user can be properly used at all times when it is manufactured.

What is claimed is:

1. A controlling method of an operation screen for operations of a remote control device, comprising the steps of:
    acquiring an attribute of a remote control device;
    determining an operation form corresponding to the remote control device from among a plurality of operation forms previously stored based on the acquired attribute of the remote control device; and
    displaying an operation screen related to the determined operation form displayed,
    wherein, in the step of determining the operation form, the operation form corresponding to the remote control device is determined by evaluating a degree of suitability between the remote control device and each of the plurality of operation forms based on the acquired attribute of the remote control device.

2. A controlling method according to claim 1, wherein the plurality of operation forms are different from each other in a combination of operation devices selected for use therein from among a plurality of operation devices.

3. A controlling method according to claim 2, wherein the plurality of operation devices includes at least one device of a pointing device, a key device, a tough panel device and a dial device.

4. A controlling method according to claim 1, wherein the plurality of operation forms are different from each other in a layout of a display element constructing the operation screen.

5. A controlling method according to claim 1, further comprising a step of, in case that the acquired attribute of the remote control device cannot be specified, acquiring an attribute of the remote control device from outside, and updating a database in which attributes of remote control devices are previously stored.

6. A computer-readable medium in which a program is stored, the program making a computer execute the controlling method according to claim 1.

7. A display controlling apparatus for making an operation screen for operations of a remote control device displayed in a display unit, the apparatus comprising:
 an acquiring unit which acquires an attribute of a remote control device;
 a determining unit which determines an operation form corresponding to the remote control device from among a plurality of operation forms previously stored in a storing unit based on the attribute of the remote control device acquired by the acquiring unit; and
 a controlling unit which displays an operation screen related to the operation form which is determined by the determining unit displayed,
 wherein the determining unit determines the operation form corresponding to the remote control device by evaluating a degree of suitability between the remote control device and each of the plurality of operation forms based on the attribute of the remote control device acquired by the acquiring unit.

8. A display controlling apparatus according to claim 7, wherein the plurality of operation forms are different from each other in a combination of operation devices selected for use therein from among a plurality of operation devices.

9. A display controlling apparatus according to claim 8, wherein the plurality of operation devices include at least one device of a pointing device, a key device, a touch panel device and a dial device.

10. A display controlling apparatus according to claim 7, wherein the plurality of operation forms are different from each other in a layout of a display element constructing the operation screen.

11. A display controlling apparatus according to claim 7, further comprising a unit which, in case that the attribute of the remote control device acquired by the acquiring unit cannot be specified, acquires an attribute of the remote control device from outside, and updates a database in which attributes of remote control devices are previously stored.

* * * * *